United States Patent
Walsh

(10) Patent No.: US 11,203,518 B2
(45) Date of Patent: Dec. 21, 2021

(54) SPILL CONTAINMENT SYSTEM

(71) Applicant: Franklin Fueling Systems, LLC, Madison, WI (US)

(72) Inventor: Jay Jerard Walsh, Verona, WI (US)

(73) Assignee: FRANKLIN FUELING SYSTEMS, LLC, Madison, WI (US)

(*) Notice: Subject to any disclaimer, the term of this patent is extended or adjusted under 35 U.S.C. 154(b) by 0 days.

(21) Appl. No.: 16/585,211

(22) Filed: Sep. 27, 2019

(65) Prior Publication Data

US 2020/0102202 A1 Apr. 2, 2020

Related U.S. Application Data

(60) Provisional application No. 62/738,578, filed on Sep. 28, 2018, provisional application No. 62/822,444, filed on Mar. 22, 2019.

(51) Int. Cl.
*B67D 7/32* (2010.01)
*G01M 3/32* (2006.01)

(52) U.S. Cl.
CPC .............. *B67D 7/3209* (2013.01); *G01M 3/32* (2013.01)

(58) Field of Classification Search
CPC .. B67D 7/3209; B65D 90/501; B65D 90/503; B65D 90/505; B65D 90/507; G01M 3/32

(Continued)

(56) References Cited

U.S. PATENT DOCUMENTS 5,656,766 A * 8/1997 Horn .................... B65D 88/76
 73/40.5 R
5,955,657 A * 9/1999 Bravo .................... G01M 3/18
 73/40.5 R (Continued)

OTHER PUBLICATIONS

"Selecting Containment Monitoring Sensors in Probes and Sensors" article issued by Franklin Fueling Systems; dated 2018. 11 pages.

(Continued)

*Primary Examiner* — Timothy P. Kelly
(74) *Attorney, Agent, or Firm* — Faegre Drinker Biddle & Reath LLP

(57) ABSTRACT

A containment sump has a primary container and a secondary container which extends only partway up the outer wall of the primary container. This "low-rise" secondary container, in certain embodiments, cooperates with the primary container to create a hermetically sealed interstitial space encompassing the bottom of the primary container, including the lower portion of the upright containment wall and the container bottom. In alternative embodiments, the secondary container is a subassembly forming an interstitial space and joined as a subassembly to the primary container. More particularly, the upper end of the interstitial space may be below pipe or other conduit penetrations through the sidewall of the primary container. At the same time, any leak which may develop over the service life of the containment sump would be contained and detected within the bottom of the primary and/or secondary containers. Therefore, the present system combines the low cost and high reliability associated with single-wall penetrations through containment sump walls, while also offering the high level of environmental protection associated with double-wall spill containment.

36 Claims, 14 Drawing Sheets

(58) Field of Classification Search
USPC ......... 137/312; 73/49.2; 141/86; 220/560.03
See application file for complete search history.

(56) References Cited

U.S. PATENT DOCUMENTS

| | | | |
|---|---|---|---|
| 7,578,169 | B2 | 8/2009 | Kenney et al. |
| 9,352,951 | B2 | 5/2016 | Marston et al. |
| 2003/0047211 | A1* | 3/2003 | Bravo ..................... B67D 7/04 137/312 |
| 2009/0212057 | A1* | 8/2009 | Bravo ..................... B67D 7/78 220/571 |
| 2011/0089071 | A1 | 4/2011 | Kuehn |
| 2018/0257925 | A1 | 9/2018 | Schultz et al. |
| 2019/0211948 | A1 | 7/2019 | West et al. |

OTHER PUBLICATIONS

"Low Liquid Level UST Containment Sump Testing Procedures" article issued by Franklin Fueling Systems; dated 2018. 6 pages.
"DC400 Dispensing Cutoff System" article issued by Franklin Fueling Systems; dated 2010. 6 pages.

* cited by examiner

SPILL CONTAINMENT SYSTEM

CROSS REFERENCE TO RELATED APPLICATIONS

This application claims the benefit of U.S. Provisional Patent Application Ser. No. 62/738,578 filed Sep. 28, 2018, and U.S. Provisional Patent Application Ser. No. 62/822,444 filed Mar. 22, 2019, both entitled SPILL CONTAINMENT SYSTEM, the entire disclosures of which are hereby expressly incorporated herein by reference.

FIELD OF THE DISCLOSURE

The present disclosure relates generally to fluid containment systems and, more particularly, to fuel containment sumps used at the junction between a fuel dispenser and an underground storage tank.

BACKGROUND OF THE DISCLOSURE

Containment sumps may be included in fueling systems to transition pipe lines, electrical lines, or other conduits between various components of the fueling system. For example, under-dispenser containment (UDC) sumps are located under fuel dispensers and contain piping and valves for distribution of hydrocarbon product such as gasoline from underground storage tanks (UST) to a customer-accessible fuel dispenser. Tank sumps are used to provide access to the interior of the UST for filling and inspection. Transition sumps are used to transition conduit from underground to above-ground locations. These and other sumps structures may be collectively referred to as "containment sumps" for a fueling system. Apertures passing through containment sump walk provide access to the related components of the fueling station, such as fuel delivery pipes, electrical conduit or the like.

Containment sumps may be monitored to ensure that any leaks from piping, pumps, fuel dispensers or other containment sump structures are contained and detected. Notification may then be provided, and corrective action taken to avoid any release of hydrocarbon product beyond the interior of the containment sump.

For example, containment sumps may have double wall construction including primary and secondary containers with an interstitial space located between their respective walls which runs the full height of the double-walled container. For monitored containment sumps, this interstitial space may be monitored to ensure there are no leaks in either of the two walls. As an example, a vacuum can be created within the interstitial space and the vacuum pressure can be monitored for consistency over time. A consistent vacuum provides evidence that there are no leaks in either the primary or secondary wall. One such vacuum-monitoring system used for traditional double-wall containment systems can be found in U.S. Pat. No. 7,578,169, filed Dec. 31, 2007 and entitled METHOD AND APPARATUS FOR CONTINUOUSLY MONITORING INTERSTITIAL REGIONS IN GASOLINE STORAGE FACILITIES AND PIPELINES, the entire disclosure of which is hereby expressly incorporated herein by reference.

The United States Environmental Protection Agency (EPA) has established requirements for regular testing of containment sumps at retail fueling facilities. These requirements are set out in 40 CFR parts 280 and 281, and further discussed in an EPA compendium entitled "Low Liquid Level UST Containment Sump Testing Procedures," attached hereto in an information disclosure statement, the entire disclosure of which is hereby expressly incorporated herein by reference. In particular, the EPA compendium notes that low-level testing is deemed by the EPA to be as protective to the environment as certain other testing procedures set forth in the requirements of 40 CFR parts 280 and 281. The testing procedures are designed to ensure any potential leak from a pump, fuel dispenser, piping or similar equipment is contained before any potential release to the environment.

For example, a fueling station operator may test the containment sump every three years by filling the sump with water and ensuring the water level does not change over a prescribed time, typically one hour. However, this procedure can be time-consuming, and the fuel station and/or the individual dispensers being tested must be taken out of service for the testing to occur. Also, the water used in the process is generally considered a hazardous waste after exposure to the sump, which increases the cost of disposal.

For double-wall containment sumps, the above-mentioned EPA requirements permit testing every three years by ensuring the integrity of the interstitial space, for example, by monitoring the interstitial space with a vacuum of similar as noted above. This testing procedure eliminates the need to take the system out of service and to dispose of testing water. However, while this double-walled system and procedure can be effective for providing and verifying a high level of environmental protection, it is considerably more complex and costly as compared to a single-wall sump system.

SUMMARY OF THE DISCLOSURE

The present disclosure provides a containment sump having a primary container and a secondary container which extends only partway up the outer wall of the primary container. This "low-rise" secondary container, in certain embodiments, cooperates with the primary container to create a hermetically sealed interstitial space encompassing the bottom of the primary container, including the lower portion of the upright containment wall and the container bottom. In alternative embodiments, the secondary container is a subassembly forming an interstitial space and joined as a subassembly to the primary container. More particularly, the upper end of the interstitial space may be below pipe or other conduit penetrations through the sidewall of the primary container. At the same time, any leak which may develop over the service life of the containment sump would be contained and detected within the bottom of the primary and/or secondary containers. Therefore, the present system combines the low cost and high reliability associated with single-wall penetrations through containment sump walls, while also offering the high level of environmental protection associated with double-wall spill containment.

In one form thereof, the present disclosure provides a containment sump, including: a container including a sidewall and defining an interior volume sized to receive at least part of a component of a fueling installation, the sidewall defining an aperture for entry of the component of the fueling installation from an exterior to the interior volume of the sump; and at least one wall defining an interstitial space positioned such that the interstitial space will be positioned below a leak from the component falling by gravity within the interior volume of the sump, the interstitial space defined by the at least one wall spaced from the aperture, whereby the component of the fueling installation can be inserted through the aperture into the interior volume of the container without passing through the interstitial space.

In another form thereof, the present disclosure provides a containment sump including: a primary container having a primary wall extending from an open upper end to a closed lower end of the primary container; and a secondary container positioned at the closed lower end of the primary container and extending at least partially up the primary wall of the primary container, the secondary container having a secondary wall extending from an open upper end to a closed lower end of the secondary container, the secondary container secured to a bottom portion of the primary wall to form a double-walled containment sump having a sealed interstitial space extending between the closed lower ends of the primary and secondary containers, and only extending partially up the primary wall.

In yet another form thereof, the present disclosure provides a method of testing the integrity of a containment sump, the containment sump including: a primary container including an open primary upper end, a closed primary lower end, and a primary wall extending therebetween, the primary container defining a primary containment height; and a secondary container including an open secondary upper end, a closed secondary lower end, and a secondary wall extending therebetween, the secondary container defining a secondary containment height less than the primary containment height to form a double-walled sump area disposed at a bottom portion of the primary container, the secondary container secured to the bottom portion of the primary container to form a sealed interstitial space between the primary wall and the secondary wall, and between the primary lower end and the secondary lower end. The method includes: producing a pressure differential within the interstitial space as compared to an ambient pressure around the containment sump; after the step of producing, monitoring the pressure differential for change for a predetermined period of time; and determining that an integrity of the interstitial space is sound if the change is below a threshold amount after the predetermined period of time.

The above-mentioned and other features of the invention and the manner of obtaining them will become more apparent and the invention itself will be better understood by reference to the following description of exemplary embodiments of the invention taken in conjunction with the accompanying drawings.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

Figure 1:
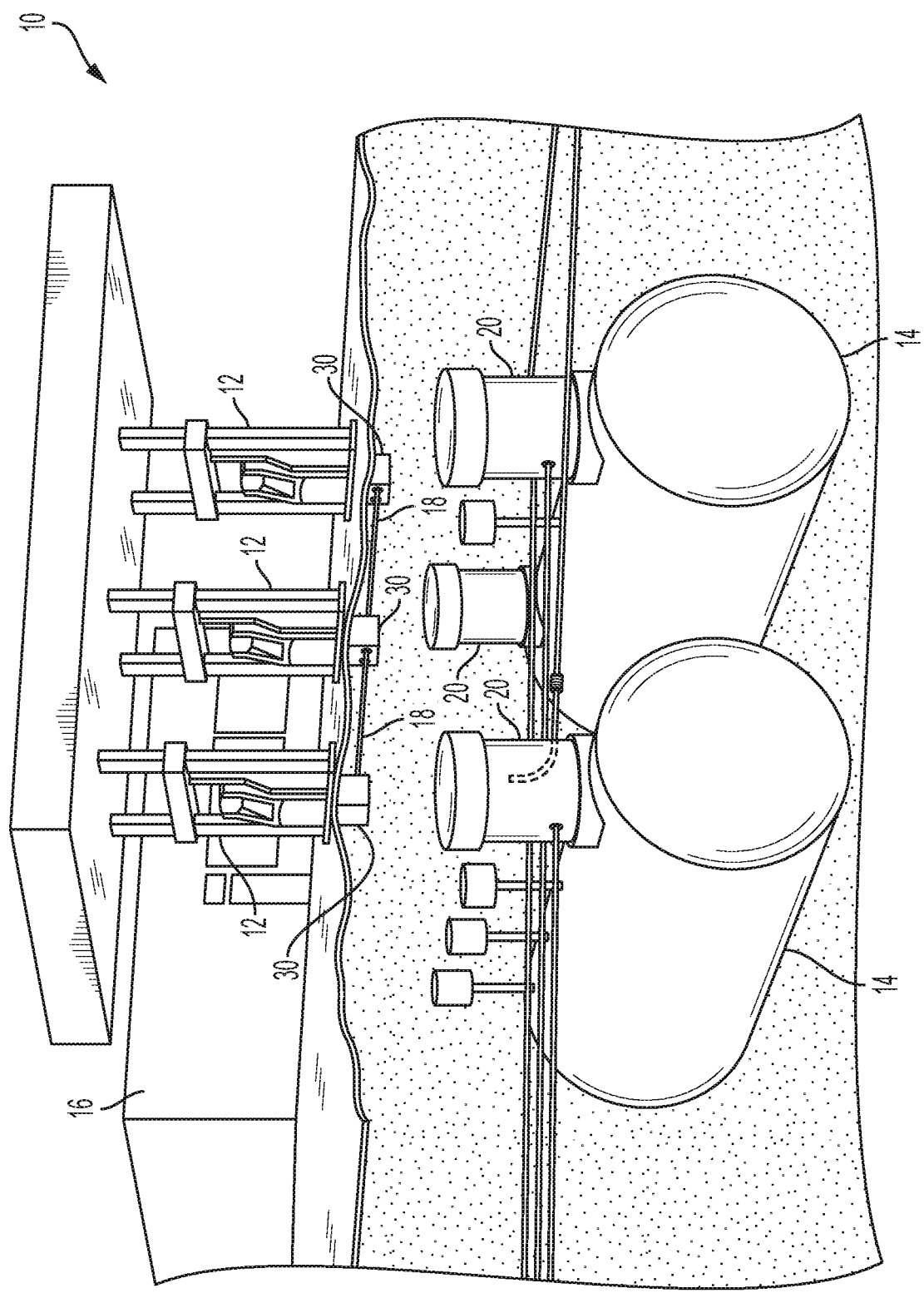
FIG. 1 is a perspective view of a fueling station incorporating a dispenser sump made in accordance with the present disclosure.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplifications set out herein illustrate embodiments of the invention, and such exemplifications are not to be construed as limiting the scope of the invention in any manner.

DETAILED DESCRIPTION OF THE DRAWINGS

For the purposes of promoting an understanding of the principals of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrative devices and described methods and further applications of the principles of the invention which would normally occur to one skilled in the art to which the invention relates.

Referring to FIG. 1, fueling station 10 includes a plurality of fuel dispensers 12 in fluid communication with underground fuel storage tanks (UST) 14. As is typical in such installations, fuel dispensers 12 are in fluid communication (not shown) with underground storage tanks 14 so that fuel nozzles associated with each fuel dispenser 12 can be utilized to dispense hydrocarbon product stored in one of underground storage tanks 14 to, for example, a vehicle or storage container. To effect the transfer of hydrocarbon product from underground storage tanks 14 through fuel dispensers 12, fuel dispensers 12 have fluid and electrical connections to, for example, submersible pumps immersed in hydrocarbon product contained in one of underground storage tanks 14. In an exemplary embodiment, fuel dispensers 12 are also electrically connected with at least one fuel management system contained in control building 16 which also houses fueling station attendants. As further discussed below, various buried conduits 18 are run between the various components of fueling station 10 to convey fluid, electrical lines, or the like. Additional details of exemplary fluid-tight conduit which may be used in connection with containment sumps 20 and/or 30 are described in U.S. Patent Application Publication No. 2019/0211948, filed Jul. 27, 2018 and entitled "WATERTIGHT ELECTRICAL CONDUIT," the entire disclosure of which is hereby expressly incorporated herein by reference.

Positioned atop underground storage tanks 14 are tank sumps 20. Sumps 20 can contain a variety of components, including electrically controlled components and the riser pipe/drop tube combination providing for fluid communication with the associated underground storage tank 14, for example. Electrical lines positioned through conduits in fueling station 10 include high voltage cables such as power cables and low voltage cables such as communication cables connected to, for example, sensors, probes or displays. Fuel conduits may also between and among the components of fueling station 10, such as between underground storage tank 14 and dispensers 12 as further described below.

Figure 2:
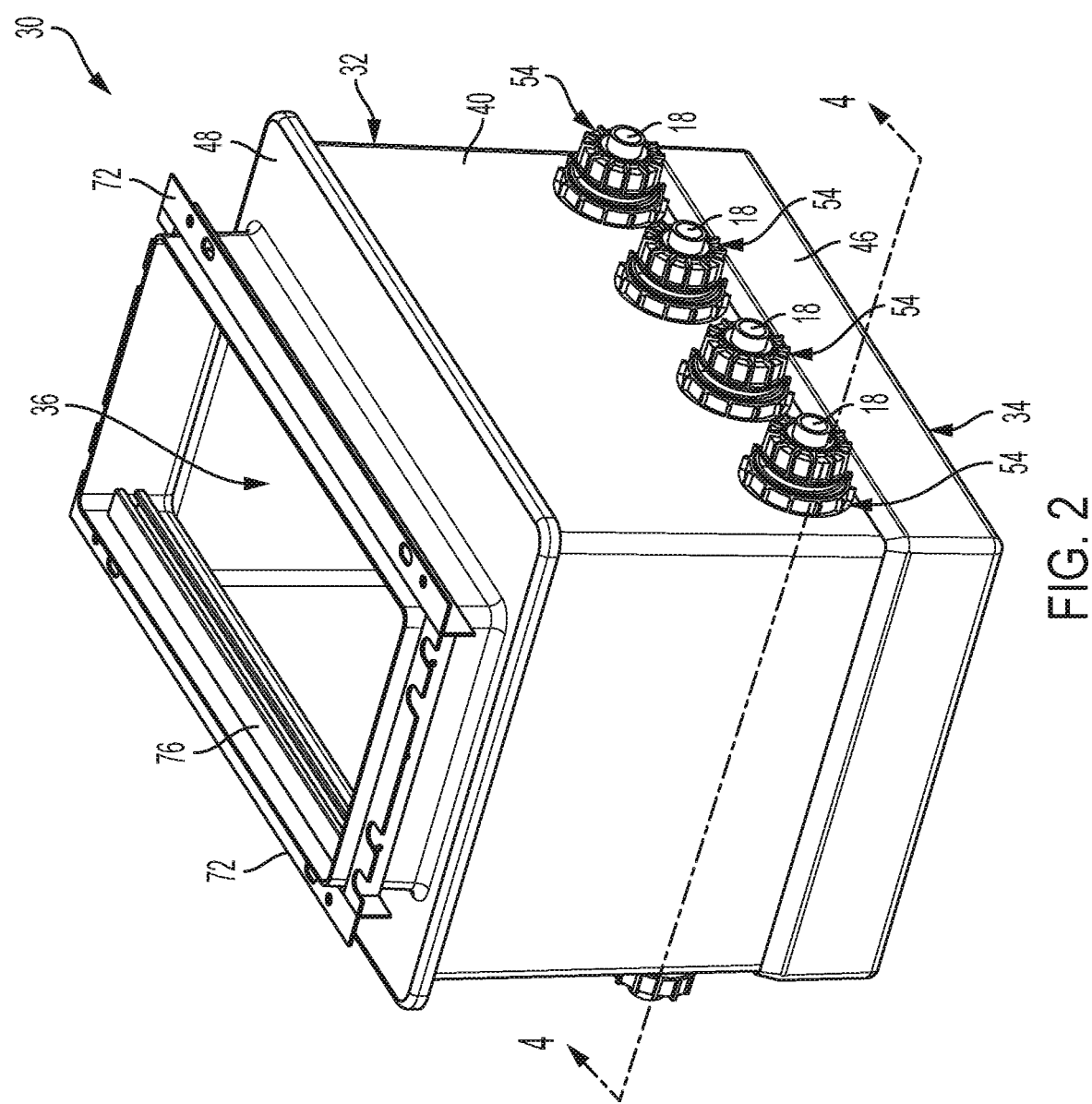
FIG. 2 is a perspective view of the dispenser sump shown in FIG. 1 with associated components for integration into the fueling station.
Figure 3:
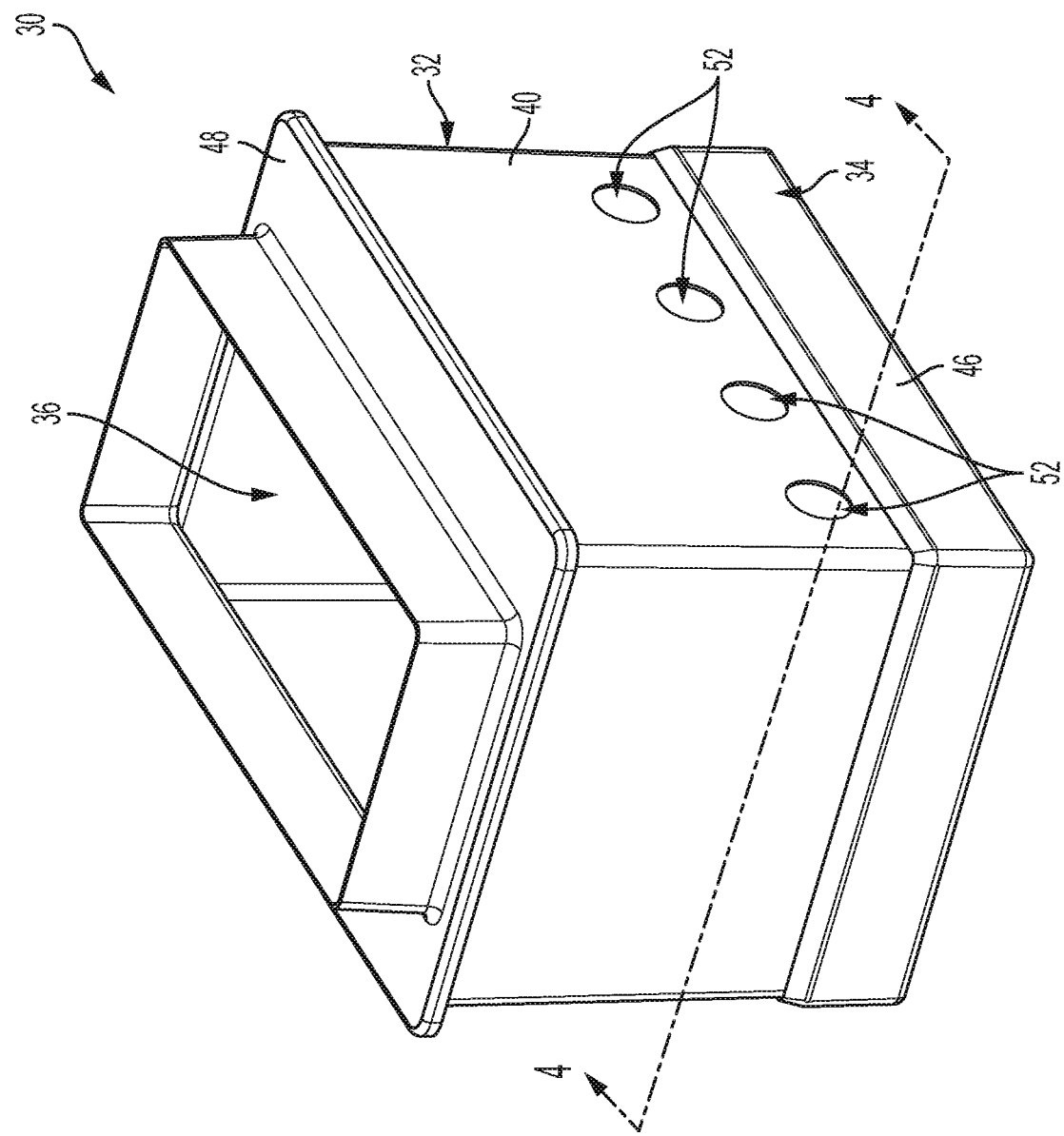
FIG. 3 is a perspective view of the dispenser sump of FIG. 2.

Dispenser sumps 30 are also positioned under each fuel dispenser 12 as shown in FIG. 1. Turning to FIGS. 2 and 3, dispenser sump 30 is shown in detail, FIG. 2 further including additional structures used to integrate dispenser sump 30 into the larger system of fueling station 10 as further discussed below. Dispenser sump 30 includes a primary container, illustrated as primary container 32, whose bottom portion is received in, surrounded by, or otherwise adjacent to a secondary container, illustrated as secondary container 34. Primary and secondary containers 32, 34, and the associate components of dispenser sump 30, are made of a material suitable for containing hydrocarbon product.

As described below with reference to FIGS. 13-16, secondary container 34 may be located along an outside wall or inside wall of primary container 32, and may be manufactured by a variety of potential methods with the common result being the creation of interstitial space 33 (FIG. 5) between primary and secondary containers 32, 34 when these two structures are attached to one another.

For purposes of the present disclosure, a "container" may refer to a monolithic container or a container assembled from multiple parts designed to capture and indefinitely retain a liquid or other flowable material. Similarly, a "wall" may refer to a monolithic wall, such as the sidewall 40 of primary container 32 shown in FIG. 2, or a wall assembly, such as the components which cooperate to form secondary container 34 shown in FIGS. 13 and 14.

As discussed in greater detail below, interstitial space 33 is formed between a surface of sidewall 40 of primary container 32 and an opposing surface of sidewall 46 of secondary container 34, and extends entirely around the outer periphery of container 32. In addition, interstitial space 33 runs contiguously from its vertical portion between sidewalls 40 and 46 to a horizontal portion at the closed lower ends of the containers 32, 34, i.e., between bottom 38 of primary container 32 and bottom 44 of secondary container 34. This contiguous span across the primary and secondary walls 40 and 46 and the primary and secondary bottoms 38 and 44 ensures that an uninterrupted double-walled sump area 50 (FIG. 4) is formed around the bottom portion of primary container 32.

Figure 4:
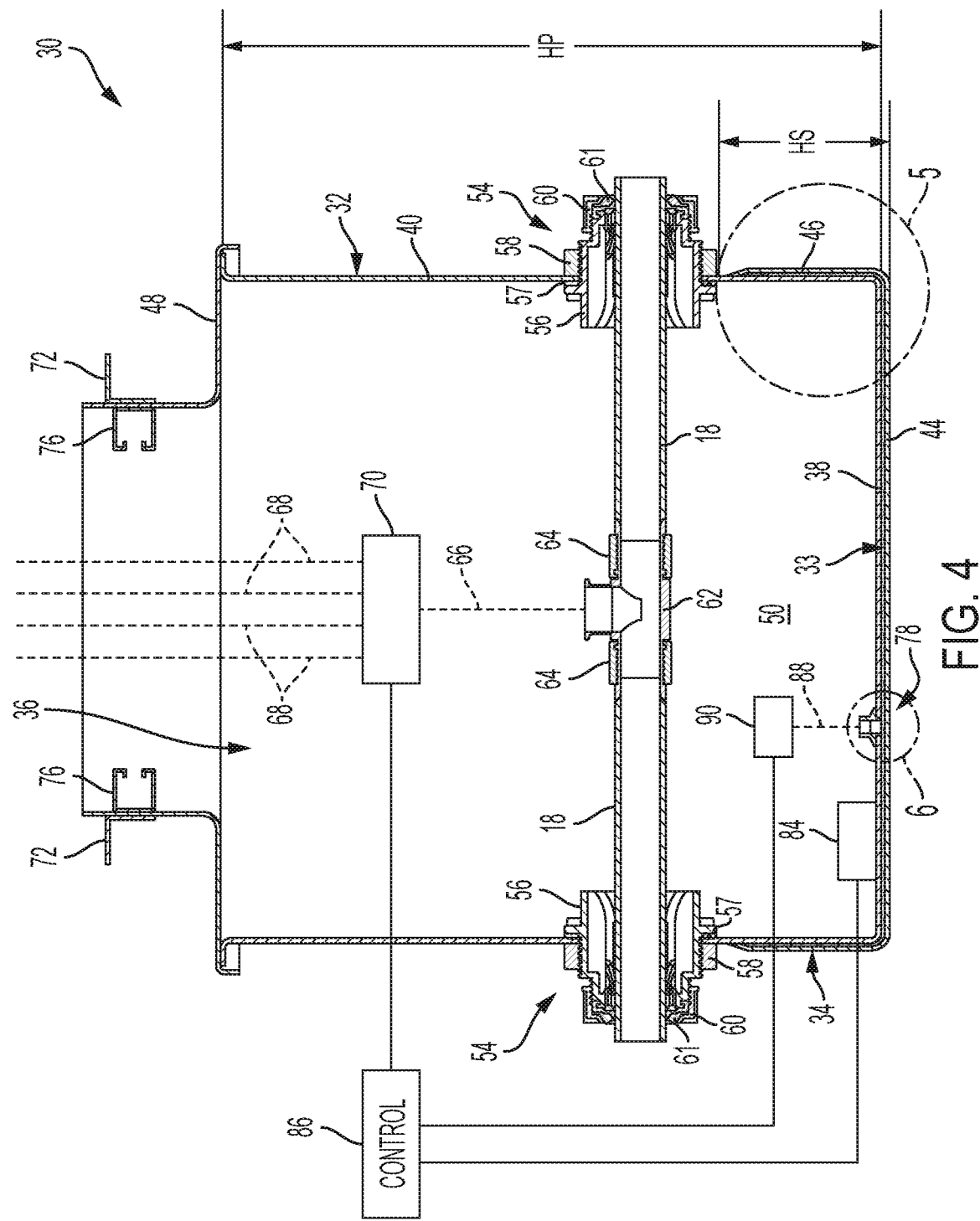
FIG. 4 is an elevation, cross section view of the dispenser sump shown in FIG. 2, taken along the line 4-4.
Figure 5:
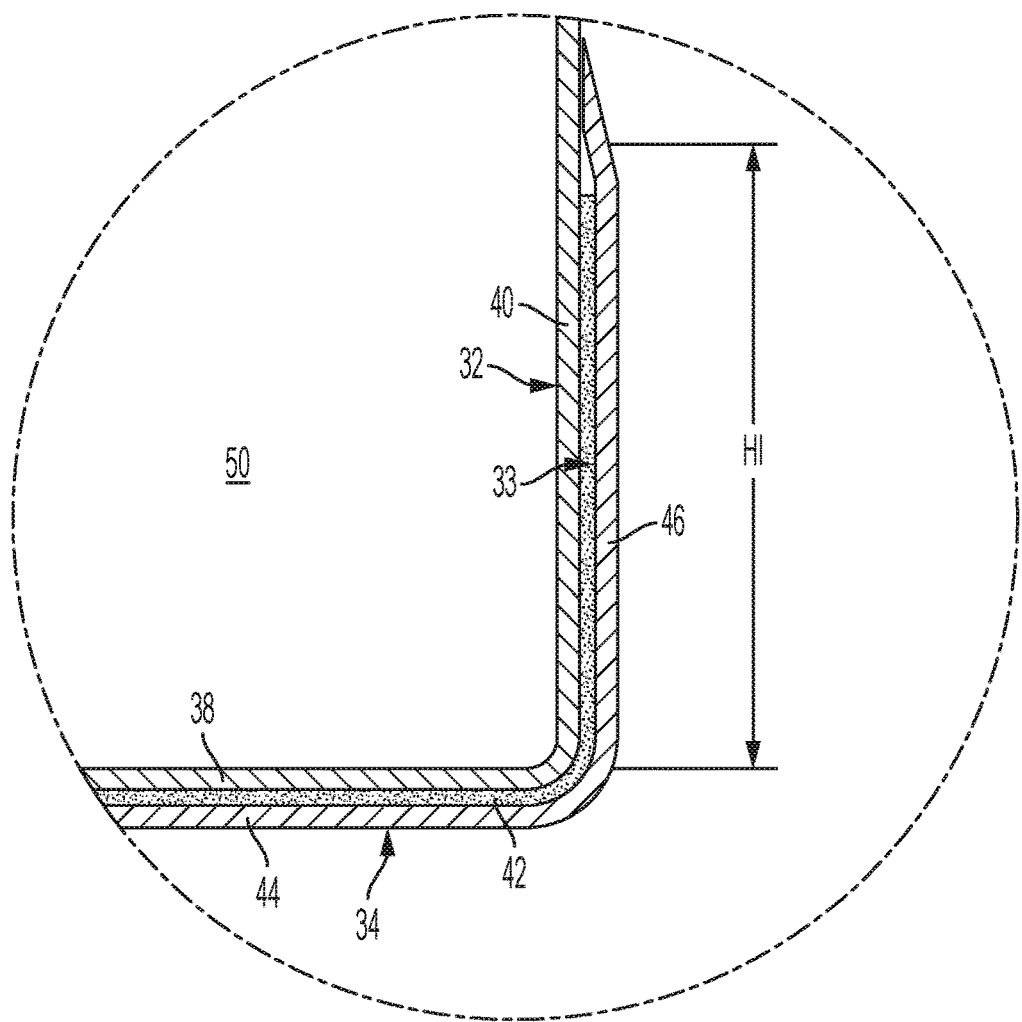
FIG. 5 is an enlarged view of a portion of FIG. 4, illustrating an interstitial space formed between primary and secondary containers of the dispenser sump.

In the exemplary embodiment of FIGS. 4 and 5, interstitial space 33 includes a layer of porous material 42 disposed between sidewalls 40 and 46 and between bottoms 38 and 44. Porous material 42 may be a 3D mesh cloth, such as a 3D glass fabric of the type available from Parabeam BV of the Netherlands. Porous material 42 provides some structure and resilience within interstitial space 33 during manufacture and service of dispenser sump 30, but allows a high degree of air flow through and among the volume of material 42 such that a positive or negative pressure applied to interstitial space 33 (e.g., by pressure module 90 shown in FIG. 4 and described in detail below) allows air to be evenly dispersed or evacuated from interstitial space 33 for testing and validation. For example, one method of manufacturing dispenser sump 30 is to wrap porous material 42 around a lower portion of primary container 32, adhering or otherwise attaching porous material 42 to all the surfaces of primary container 32 where interstitial space 33 is desired. Secondary container 34 may then be formed by spraying or otherwise depositing a fluid-impermeable material, such as fiberglass, over porous material 42 and directly onto adjacent areas of primary container 32. When the deposited fluid-impermeable material is dry and hardened, secondary container 34 has been formed and interstitial space 33 has been established. Additional details of this production method, as well as other alternative production methods, are described in detail below with reference to FIGS. 13-16.

Referring to FIG. 4, if any leak were to form within or through dispenser sump 30, fluid accumulation would occur first in sump area 50 and be detected by sensor 84 and controller 86, as further discussed below. The double-walled containment afforded by the interstitial space 33 formed between containers 32 and 34 ensures that any such accumulation will not be released into the environment, even if a breach has formed in one of the containers 32 or 34. Moreover, any such breach may be detected by regularly testing the integrity of interstitial space 33 via pressure module 90 and controller 86, as also discussed further below.

Primary container 32 defines an overall height HP, shown in FIG. 4, between its open upper end and its substantially closed bottom 38. By contrast, secondary container 34 defines a height HS between its open upper end and its closed lower end, which is substantially less than height HP of primary container 32. In one embodiment, height HS may be as little as 3 inches, 4 inches or 5 inches, or as much as 6 inches, 7 inches or 8 inches. Stated another way, height HS of secondary container 34 may be a small percentage of the overall height HP of primary container 32, such 10%, 15%, 20%, 25%, 30% or 35% for example. Height HS contributes to the overall vertical height HI of interstitial space 33, shown in FIG. 5. Height HI is defined between the upper exposed surface of bottom 38 of primary container 32, and the top of the enclosed area formed at the junction between sidewall 46 of secondary container 34 and sidewall 40 of primary container 32. In the illustrated embodiment of FIG. 5, this junction is formed as a tapered weld or adhesive seam between sidewalls 46 and 40. Interstitial height HI determines the maximum depth of fluid within the double-walled sump area 50, which may be between about 4 inches and about 6 inches, or may be any other nominal height as dictated by system design and regulatory requirements, for example. In an exemplary embodiment where dispenser sump 30 is used in a fueling station context as shown in FIG. 1, sump area 50 may have a fluid capacity of at least several gallons, such as at least 2-20 gallons.

In an exemplary embodiment, height HS of secondary container 34 may be set low enough to avoid interference with structures passing through sidewall 40 of primary container 32. As shown in FIG. 3, for example, secondary container 34 is assembled to primary container 32 such that apertures 52 formed through sidewall 40 remain above the top of secondary container 34 by at least a minimum desired margin. This margin may be any nominal amount sufficient to allow for the use of fluid-tight conduit installations through apertures 52. For example, as shown in FIGS. 2 and 4, conduit adapters 54 may be mounted to apertures 52 without any interaction between adapters 54 and sidewall 46 of secondary container 34. Thus, secondary container 34 and interstitial space 33 do not interrupt the installation of conduit adapters 54 to the single-walled construction of primary container 32. In this way, pipes or conduits 18 may pass through a single wall of dispenser sump 30 to avoid the complexity and expense associated with penetration through double-walled containers, while interstitial space 33 is still provided such that dispenser sump 30 retains the protective features of double-walled containment.

As shown in FIG. 4, conduit adapters 54 each include connector body 56 which passes through a respective aperture 52 (FIG. 3) from within the interior of primary container 32. Gasket 57 may be disposed between a flange formed on connector body 56 and the interior surface of sidewall 40, as illustrated. Connector barrel 58 may then be threadably received upon connector body 56 and tightened against the outer surface of sidewall 40 to compress gasket 57, thereby creating a sealed connection between connector body 56 and sidewall 40 of primary container 32. Conduit 18 may then be passed through the bore of connector body 56, and grommet 60 may then be threadably received upon connector body 56 and tightened to compress gasket 61 (or an arrangement of gaskets) onto the outer surface of conduit 18, thereby forming a sealed connection between connector body 56 and conduit 18. In this way, conduit adapter 54 creates a fluid tight seal between primary container 32 and conduit 18, such that any fluid contained within primary container 32 cannot leak out through apertures 52 (FIG. 3). Moreover, apertures 52 are formed only through the single-wall of primary container 32, and do not pass through or otherwise interact with the interstitial space 33 created by the double-walled construction of dispenser sump 30 created by secondary container 34. This, in turn, avoids the cost and complexity associated with entry fittings or other apertures formed through a double-wall sealed interstitial space, thereby promoting reliable and low-maintenance service over the service life of dispenser sump 30, which may be up to thirty years in some applications. Moreover, the lack of penetrations through interstitial space 33 facilitates a highly reliable testing and validation for the integrity of interstitial space 33, as further discussed below.

Figure 8:
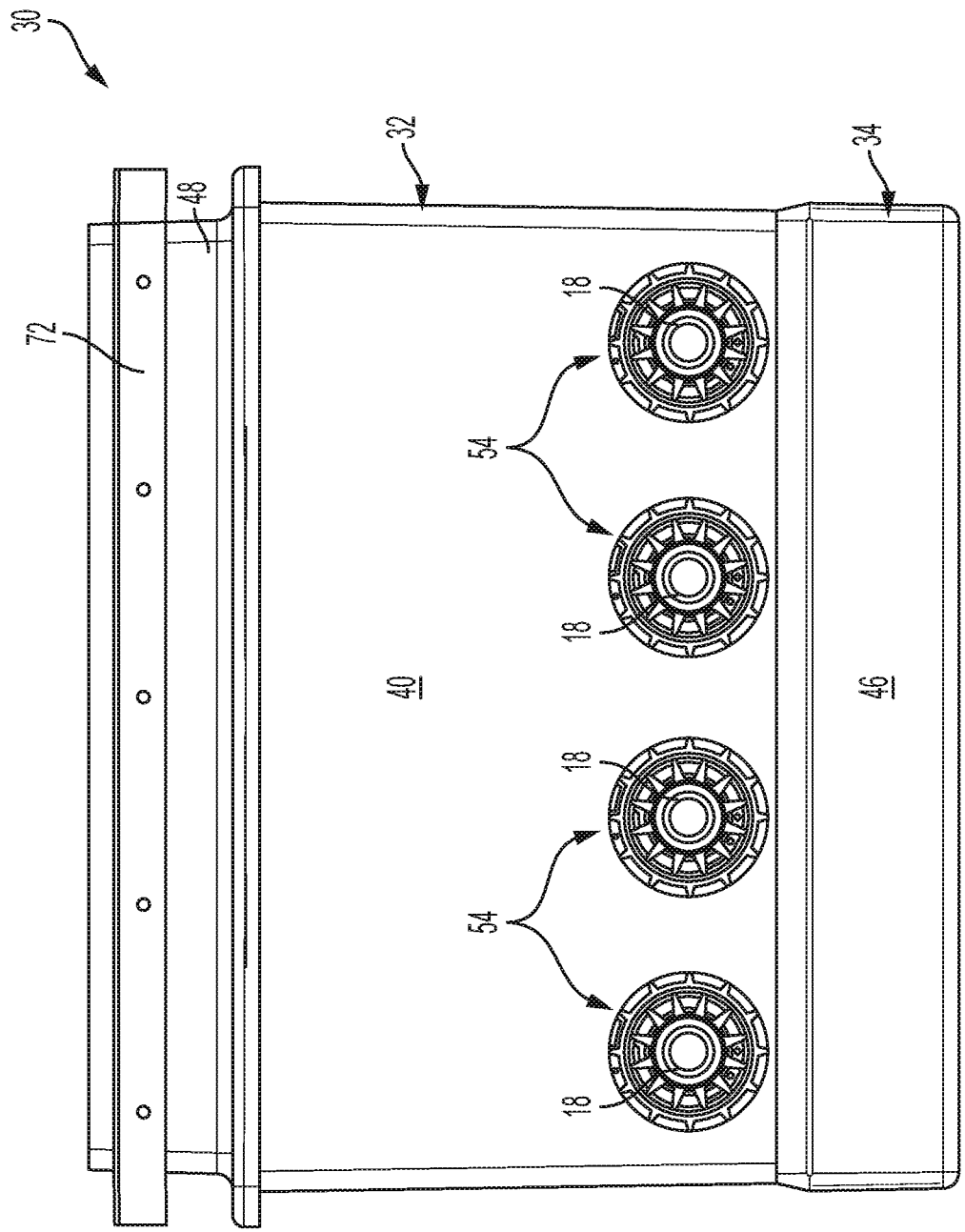
FIG. 8 is a right side, elevation view of the dispenser sump and associated structures shown in FIG. 2, it being understood that the left side view is identical.

Referring still to FIG. 4, conduits 18 may be joined to one another and to downstream structures within the interior of sump 30 via T-junction 62. In the illustrated embodiment, a fluid-tight connection is formed by junction nuts 64 which seal conduits 18 to T-junction 62 via a threaded engagement. In the illustrative embodiment of FIGS. 8 and 9, four sets of conduits 18 and T-junctions 62 may pass through the interior of dispenser sump 30. Each set may be used for a different fluid, such that dispenser sump 30 may be used to protect against leaks in conveying any of four different grades of fuel from respective underground storage tanks 14 (FIG. 1) to a respective fuel dispenser 12. For example, dispenser sump 30 may receive, redirect and convey gasoline at three different octane levels (e.g., 87, 89 or 93 octane) and diesel through respective sets of conduits 18 and T-junctions 62. To this end, each T-junction 62 may include a discharge port which routes fluid downstream to an output conduit 66, shown schematically in FIG. 4 for simplicity. This downstream flow may be mediated by valve assembly 70, which receives flow from output conduit 66 and selectively admits or prevents fluid flow from output conduit 66 to a downstream delivery point, such as the nozzle of fuel dispenser 12, via one or more delivery conduits 68. Valve assembly 70 may be electrically operated by controller 86, as further described below.

Figure 9:
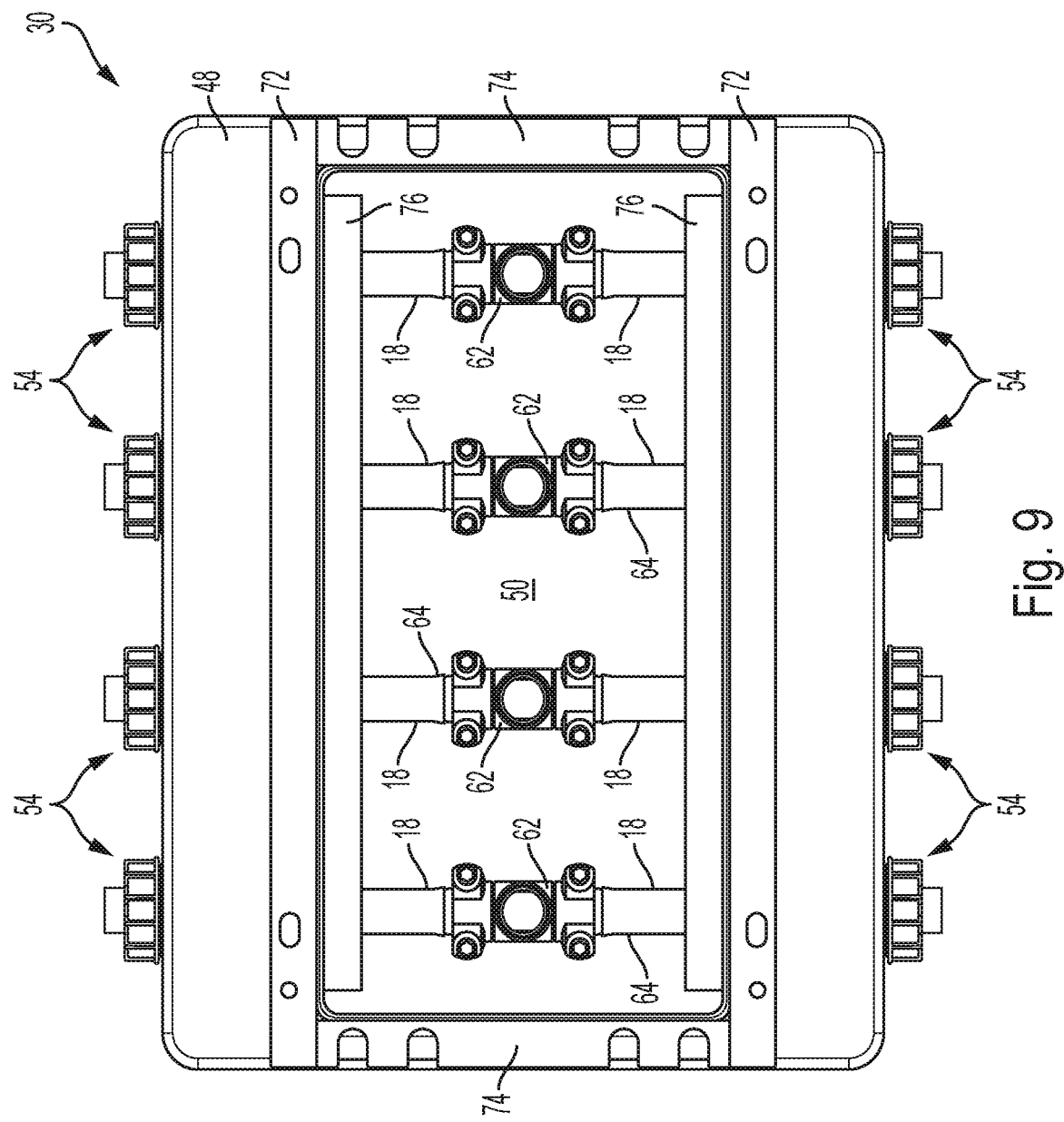
FIG. 9 is a top elevation view of the dispenser sump and associated structures shown in FIG. 2.
Figure 10:
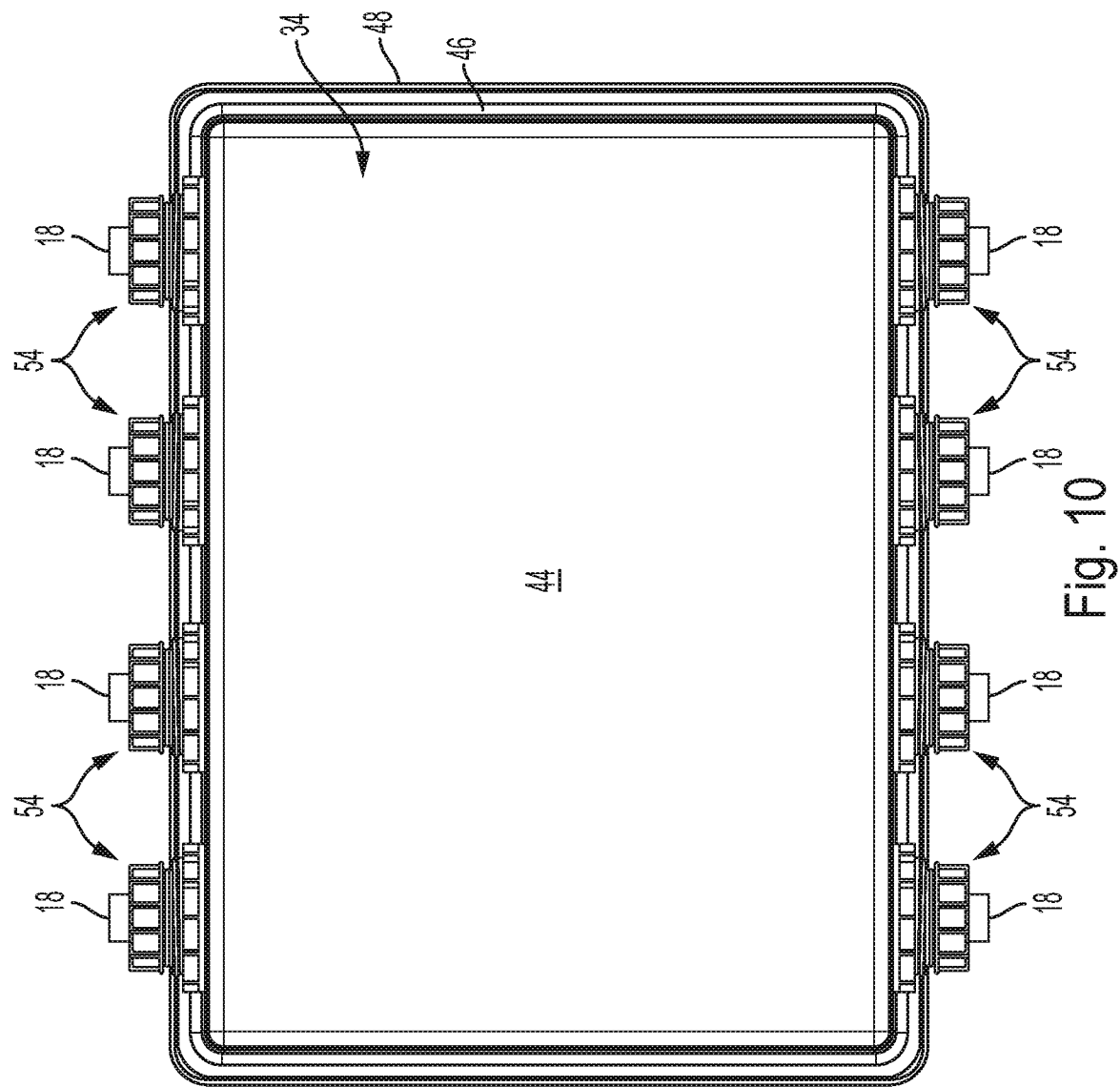
FIG. 10 is a bottom elevation view of the dispenser sump and associated structures shown in FIG. 2.

In the exemplary embodiment of FIGS. 2-4, dispenser sump 30 further includes a top wall 48 which is sealingly connected to the open upper end of primary container 32 (as best seen, for example, in FIG. 4). Top wall 48 partially encloses the open upper end of primary container 32 and creates an access aperture 36 of a desired size and configuration, such as the illustrated rectangular configuration (FIG. 3) which may correspond to the footprint of fuel dispenser 12. An arrangement of hangers 72 and 74, illustrated in FIGS. 2 and 9, may be fixed to the outer surface of the upstanding portion of top wall 48, such as by welding, and are positioned to engage a support structure adjacent top wall 48. For example, the illustrated hangers 72, 74 may be angles with a vertical leg fixed to top wall 48, and a horizontal leg extending outwardly to engage and hang off of an adjacent surface at grade, such as a concrete surface beneath fuel dispenser 12. As best seen in FIG. 9, hangers 72, 74 may also include various apertures or slots to facilitate a bolted attachment of dispenser sump 30 to the adjacent support structure.

Tracks 76 may also be fixed to the upstanding portion of top wall 48, as shown in FIGS. 4 and 9. Tracks 76 are a support structure within aperture 36 and proximate the open upper end of primary container 32, used to hang or otherwise support structures at a desired position and configuration within the interior of dispenser sump 30. For example, valve assembly 70, shown in FIG. 4, may be supported by tracks 76.

Figure 6:
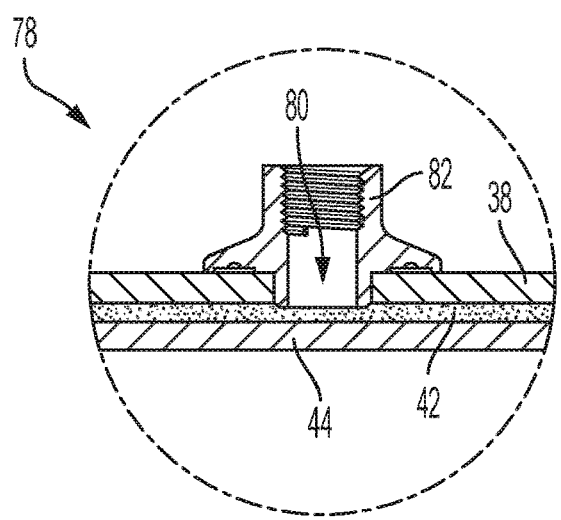
FIG. 6 is an enlarged view of a portion of the dispenser sump shown in FIG. 4, illustrating an access point to the interstitial space of the dispenser sump for generation and monitoring of pressure therewithin.
Figure 7:
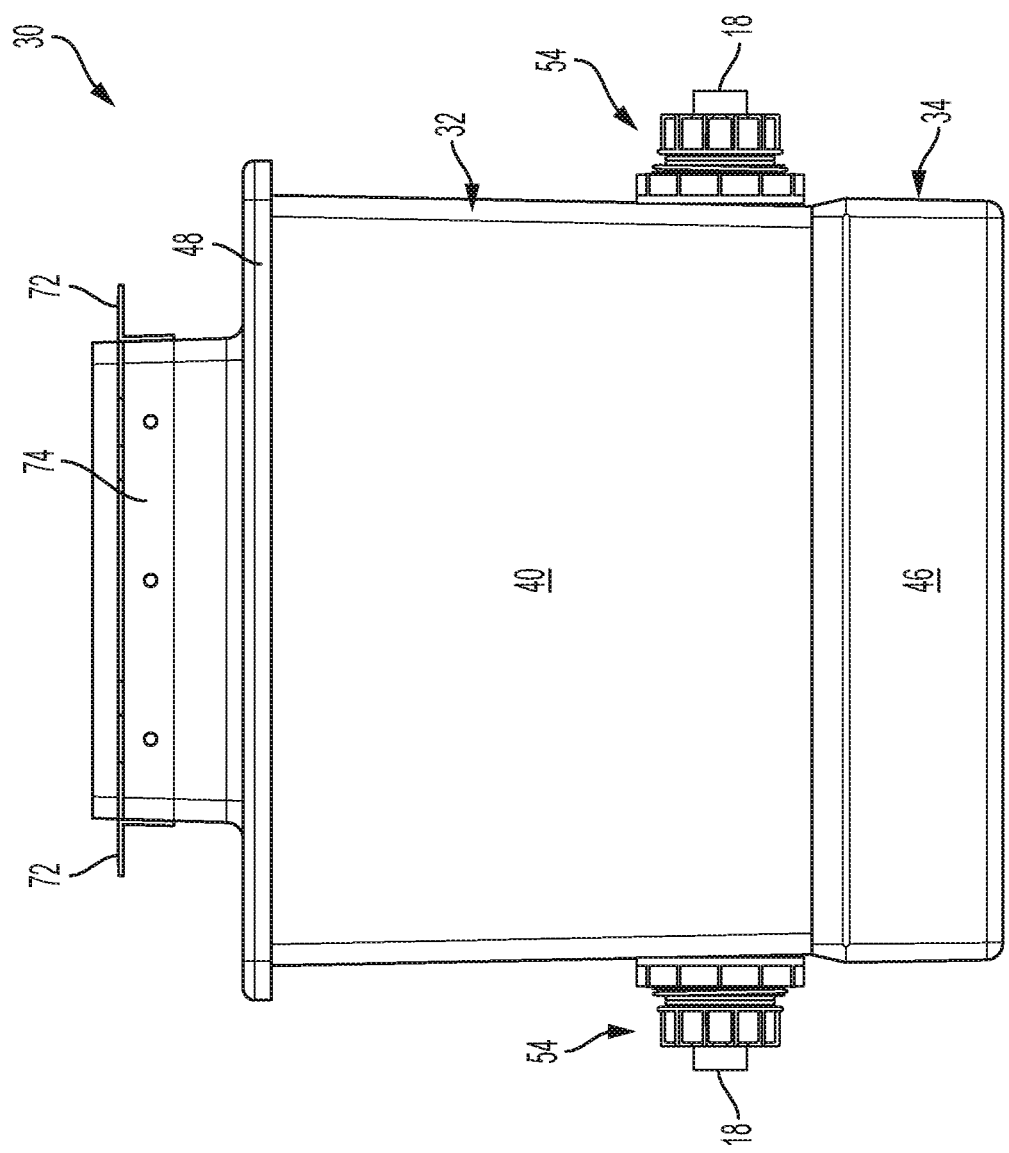
FIG. 7 is a front elevation view of the dispenser sump and associated structures shown in FIG. 2.

FIGS. 4 and 6 illustrate access point 78 which allows fluid flow into and out of interstitial space 33 through the otherwise substantially closed bottom 38 of primary container 32. For purposes of the present disclosure, the "closed lower ends" of primary and/or secondary containers 32, 34 may include an aperture or opening such as access point 78, while remaining nominally closed. Moreover, a "closed lower end" of primary and/or secondary containers 32, 34 denotes an end of the container which does not allow fluid ingress or egress when functioning normally, in contrast to the open upper ends through which fluid freely flows. Access point 78 and other similar sealed apertures meet this definition because it does not allow fluid to flow out of primary container 32 if functioning normally, as described further below.

Access point 78 includes an interstitial port 80 formed through bottom 38 and in fluid communication with interstitial space 33. Sealingly connected to port 80 is fitting 82, which provides a threaded connection for pressure line 88 extending from fitting 82 to pressure module 90, shown schematically in FIG. 4 for simplicity. Pressure module 90 may be activated, such as by a signal received from controller 86, to generate a positive or negative pressure within interstitial space 33 via pressure line 88 and interstitial port 80. When a desired nominal pressure differential has been achieved within interstitial space 33 as compared to the ambient pressure around dispenser sump 30, pressure module 90 and controller 86 may cease increasing or decreasing the level of pressure and monitor the change in the nominal pressure differential within interstitial space 33 over a period of time, such as about 10 minutes. If the level of pressure changes by less than a threshold amount during the monitored period, interstitial space 33 may be considered to be verified as leak free and the integrity of interstitial space 33 is considered to be sound. At this point, the test may be considered complete.

In one exemplary embodiment, for example, a vacuum pressure may be applied to a nominal pressure of 30 inches of water column. The vacuum source may then be removed or otherwise deactivated, and the internal pressure is then monitored. After 10 minutes, a retained nominal pressure of at least 24 inches of water column may be considered to demonstrate a leak-free interstitial space. In some testing regimes, this 10-minute pressure test may be completed periodically, such as annually or tri-annually. This test may be performed manually by an operator, or automatically via controller 86 (as further described below).

Such testing of the integrity of interstitial space 33 may be conducted on a periodic basis, or continuously as required or desired for a particular application and or regulatory environment. Testing and verification of the integrity of interstitial space 33 improves the reliability of containment by dispenser sump 30 and ensures that if a leak where to develop, any fluid accumulated within double-walled sump area 50 would be safely retained until remedial action can be taken. In an exemplary embodiment, pressure module 90 creates a vacuum pressure within interstitial space 33 and a nominal pressure lower than ambient pressure is monitored for maintenance over a period of time, which may be as little as 3 minutes, 7 minutes or 10 minutes or as much as 30 minutes, 45 minutes or 60 minutes, for example. If the pressure rises by more than a small amount during the period, a leak is determined and further steps are taken as discussed in detail below. Advantageously, such testing may be completed in substantially less than the one-hour testing typically allotted for testing procedures in which the interior of a containment sump is filled with water, because pressure leaks are typically detectable in much less than one hour (such as about 10 minutes for some designs). Further details of an exemplary pressure monitoring system which may be used in conjunction with dispenser sump 30 and fueling station 10 is described in U.S. Pat. No. 7,578,169 filed Dec. 31, 2007 and entitled "METHOD AND APPARATUS FOR CONTINUOUSLY MONITORING INTERSTITIAL REGIONS IN GASOLINE STORAGE FACILITIES AND PIPE LINES", the entire disclosure of which is hereby expressly incorporated herein by reference. Yet further details of interstitial monitoring systems and the context of double-walled containment sumps may be found in U.S. Patent Application Publication No. 2011/0089071, filed Oct. 14, 2010 and entitled "SPILL CONTAINMENT SYSTEM", the entire disclosure of which is hereby expressly incorporated herein by reference.

In one exemplary embodiment, periodic testing of interstitial space 33 may be accomplished annually to establish the continued integrity of interstitial space 33, which may be effected by activation of pressure module 90 to create, for example, a vacuum pressure within interstitial space 33 as described above. Such periodic testing may, in some cases, accompany other annual or periodic tests typically associated with fueling station 10, such as testing of sensor 84 (FIG. 4), visual inspection of the interior of containment sumps such as sumps 20 and 30 (FIG. 1), and visual inspection of underground storage tank 14 (FIG. 1). As noted above, controller 86 may be provided to monitor and control the systems of dispenser sump 30, including valve assembly 70, sump sensor 84, and pressure module 90 (FIG. 4), for example. In one embodiment, controller 86 may be integrated into a larger control system for fueling station 10. Such larger control system may be designed to deactivate fuel dispensers 12, and/or deactivate a submersible fuel pump which distributes fuel directly from underground storage tanks 14, and/or issue reports or alerts to fueling station personnel regarding the operation of the various systems of fueling station 10. One exemplary such control and monitoring system, designed to work in the context of fueling station 10 and control building 16, is described in U.S. Pat. No. 9,352,951, filed Sep. 28, 2012 and entitled "FUEL DELIVERY MANAGEMENT SYSTEM", the entire disclosure of which is hereby expressly incorporated herein by reference.

Alternatively, a sump-based control and monitoring system may be used in connection with containment sumps made in accordance with the present disclosure, obviating the need for a centralized control system. One such sump-based system is the DC400 Dispensing Cutoff System available from Franklin Fueling Systems of Madison, Wis. and described in "DC400 Dispensing Cutoff System" attached hereto in an information disclosure statement. These sump-based systems may monitor sensor 84 for evidence of fluid intrusion into sump area 50, and may directly disable fuel dispenser 12 (FIG. 1) and/or the submersible pump in UST 14 as discussed below, for example.

Sump sensor 84 is schematically illustrated in FIG. 4. As shown, sensor 84 is located at or near the bottom 38 of primary container 32, and within the double-walled sump area 50 of dispenser sump 30. Sump sensor 84 is configured to activate in the presence of liquid within sump area 50, such that liquid intrusion to the interior of dispenser sump 30 causes sump sensor 84 to send a signal to controller 86 indicative of fluid presence in sump area 50. In one exemplary embodiment, sensor 84 may include a float designed to be buoyant on water, liquid fuels or other liquids which may be present in sump 30. As liquid accumulates in sump 30, the float raises along a constrained path. When the float has raised by a threshold amount, the float may activate a switch, such as a proximity switch, such that a signal is issued indicative of an unacceptable level of fluid intrusion into sump 30. Various exemplary float-based sensors 84 are available from Franklin Fueling Systems of Madison, Wis., USA, such as the ULS and UHS liquid sensors shown as described in "Probes and Sensors" attached hereto in an information disclosure statement, the entire disclosure of which is hereby incorporated herein by reference.

In response to this signal, controller 86 may deactivate valve(s) 70 to shut down dispenser 12, and/or send a signal or alert to control building 16 (FIG. 1) or another location to inform station operators of the fluid intrusion, and/or take other corrective action. Moreover, valve 70 may take the form of an electrical control system such as an electrical controller operable to disable or enable the function of fuel dispenser 12. One such controller is shown and described in the description of the DC400 Dispensing Cutoff System attached hereto in an information disclosure statement, for example. Generally speaking, valve 70 may be any device operable to selectively permit or prevent a flow of fluid from underground storage tank 14 (FIG. 1) to the nozzle of dispenser 12.

In another control modality, controller 86 may deactivate the submersible pump(s) in one or more USTs 14 (FIG. 1) is response to a fluid-presence signal from sensor 84. This action would shut down not only the individual dispenser 12 served by the dispenser sump 30 where liquid is present, but also any other dispensers 12 served by the UST 14.

Pressure module 90 is also operably connected to controller 86 as shown schematically in FIG. 4. Pressure module 90 can be activated or deactivated by controller 86, and can send a signal to controller 86 indicative of whether the integrity of interstitial space 33 is deemed to be sufficient or insufficient based on a pressure change over a specified period as discussed above. When interstitial space 33 is deemed to be of insufficient integrity, a signal or corrective action may be issued by controller 86 in the same manner as the corrective actions discussed above with respect to sump sensor 84, such as issuing an alert to control building 16 and/or a disabling valve(s) 70 to shut down fuel dispenser 12.

As noted above, FIGS. 13-16 illustrate three exemplary methods for manufacturing dispenser sump 30. Each illustrated manufacturing method differs in the initial constructs used as constituent parts, and in the methods used for the creation of interstitial space 33, but the end result for all three methods is a dispenser sump 30 with interstitial space 33 formed between primary container 32 and secondary container 34, as described above with respect to FIGS. 2-10.

Figure 13:
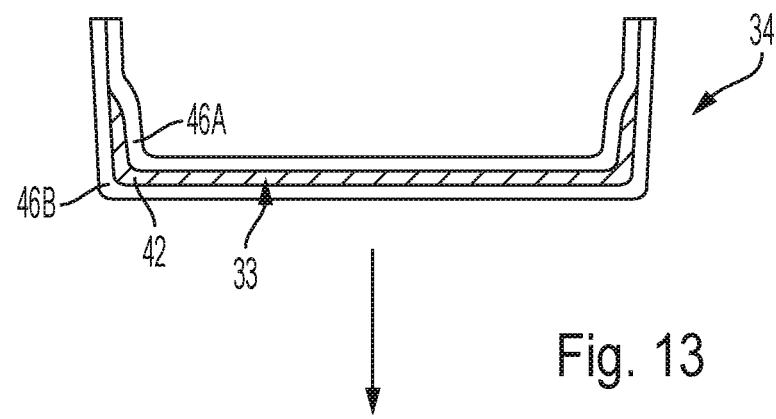
FIG. 13 is an elevation, cross-section view of a secondary container in accordance with the present disclosure.
Figure 14:
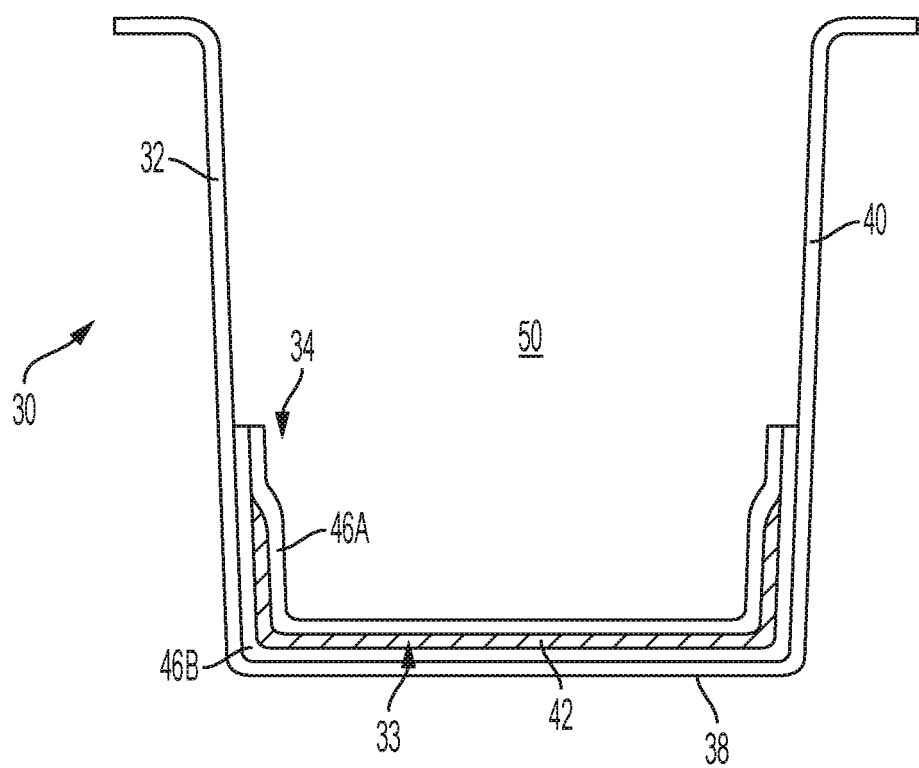
FIG. 14 is an elevation, cross-section view of a dispenser sump in accordance with the present disclosure, incorporating the secondary container of FIG. 13.

FIGS. 13 and 14 depict a separately manufactured secondary container 34 which is placed into the interior of a primary container 32. As shown in FIG. 13, secondary container 34 has an open molded construction in which an impermeable material, such as fiberglass or another polymer-based material, is molded over porous material 42. For example, a first sidewall portion 46A may be formed around the interior surface of porous material 42, and a second sidewall portion 46B may be formed around the interior surface of porous material 42. Sidewall portions 46A, 46B may be fused or otherwise hermetically fixed to one another to establish interstitial space 33. This finished secondary container 34 may then be installed adjacent to sidewall 40 of primary container 32. In the illustrative embodiment of FIG. 14, secondary container 34 is received within the interior of primary container 32, though it is also contemplated that secondary container 34 can be sized to receive the bottom portion of primary container 32. Once seated together and positioned adjacent to one another, primary and secondary containers 32, 34 are secured to one another, for example, by adhesives and/or sprayed-on fiberglass. In an exemplary embodiment, the junction between the upper end of secondary container 34 and the adjacent sidewall 40 of primary container is sealed such that drips or other leaking fluid is directed into sump 50 rather than between primary and secondary containers 32, 34.

Figure 15:
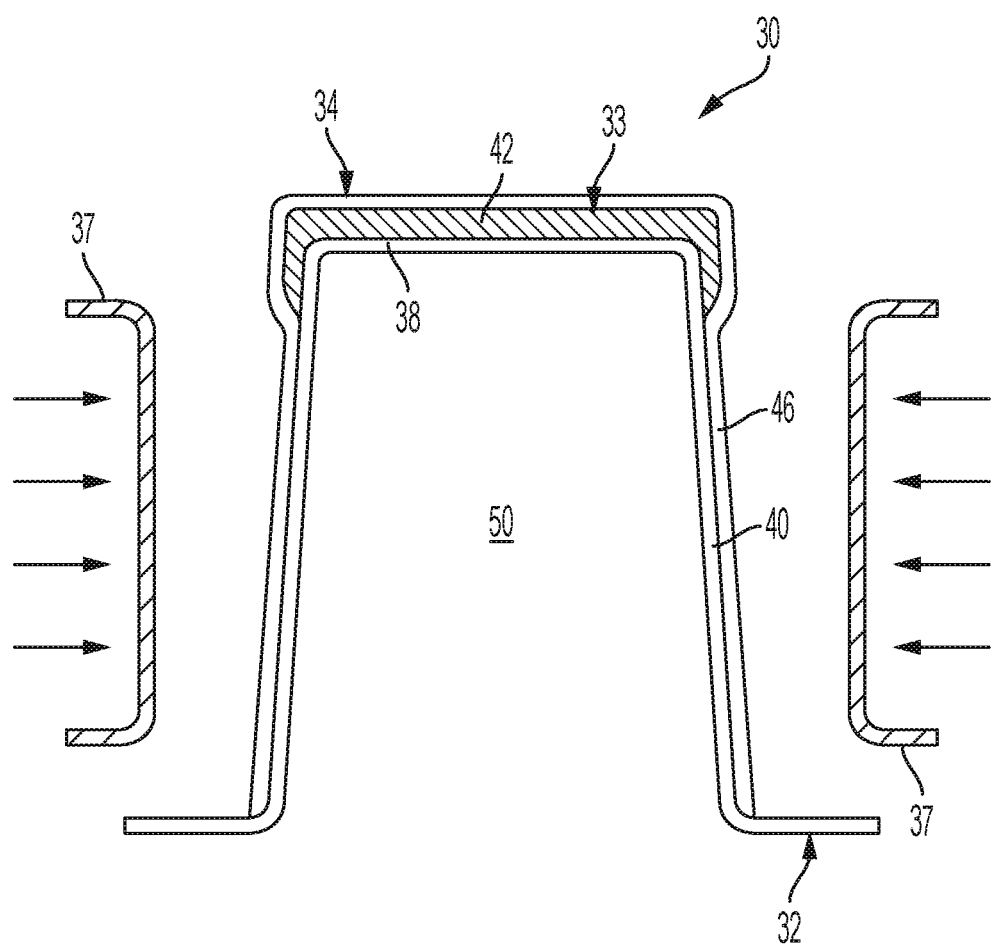
FIG. 15 is an elevation, cross-section view of another dispenser sump in accordance with the present disclosure, shown during its manufacturing process.

FIG. 15 depicts another manufacturing method for dispenser sump 30 as illustrated in FIGS. 2-10 and described in detail above. In this manufacturing method, secondary container 34 is formed by spraying or otherwise depositing an impermeable material, such as fiberglass, over porous material 42 and substantially or entirely up the outer surface of wall 40 of primary container 32. After the material for secondary container 34 is deposited but before it is cured, press plates 37 are actuated around the entire periphery of wall 46 of primary container 32 and pressed onto the outer surface of wall 40 to close any gaps therebetween and hermetically seal interstitial space 33. As shown in FIG. 15, press plates 37 do not actuate upon the area including porous material 42, such that the spacing between walls 40, 46 is maintained to preserve interstitial space 33.

Figure 16:
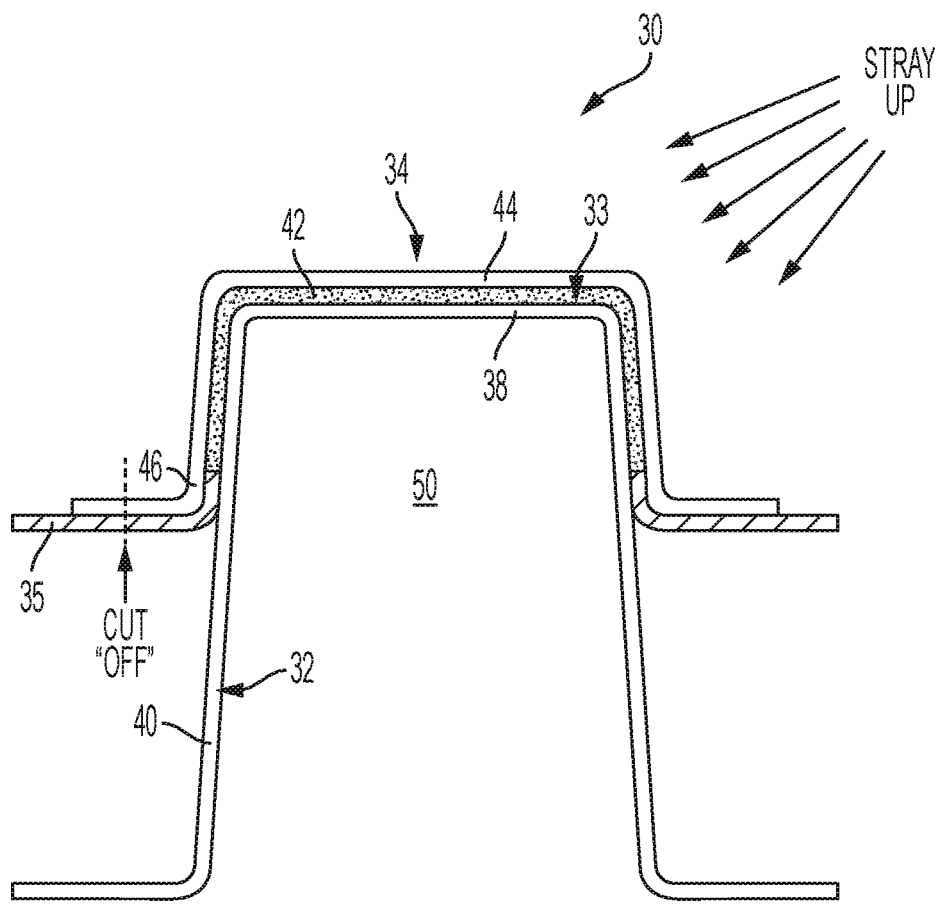
FIG. 16 is an elevation, cross-section view of yet another dispenser sump in accordance with the present disclosure, shown during its manufacturing process.

FIG. 16 depicts yet another manufacturing method for dispenser sump 30 as illustrated in FIGS. 2-10 and described in detail above. In this manufacturing method, secondary container 34 is created by spraying or otherwise depositing an impermeable material, such as fiberglass, over porous material 42 wrapped around the bottom portion of primary container 32 and slightly beyond, such that porous material 42 is encapsulated by secondary container 34. Masking flange 35 is glued or otherwise fixed to the exterior of sidewall 40 of primary container 32, and serves to set the upper end of secondary container 34 and contain any overspray as secondary container is formed. When secondary container 34 is fully formed with interstitial space 33 hermetically sealed between primary and secondary containers 32, 34, the unneeded portions of masking flange 35 and any accumulated sprayed material contained thereon may be cut away, leaving dispenser sump 30 substantially as shown in FIGS. 2-10

Figure 11:
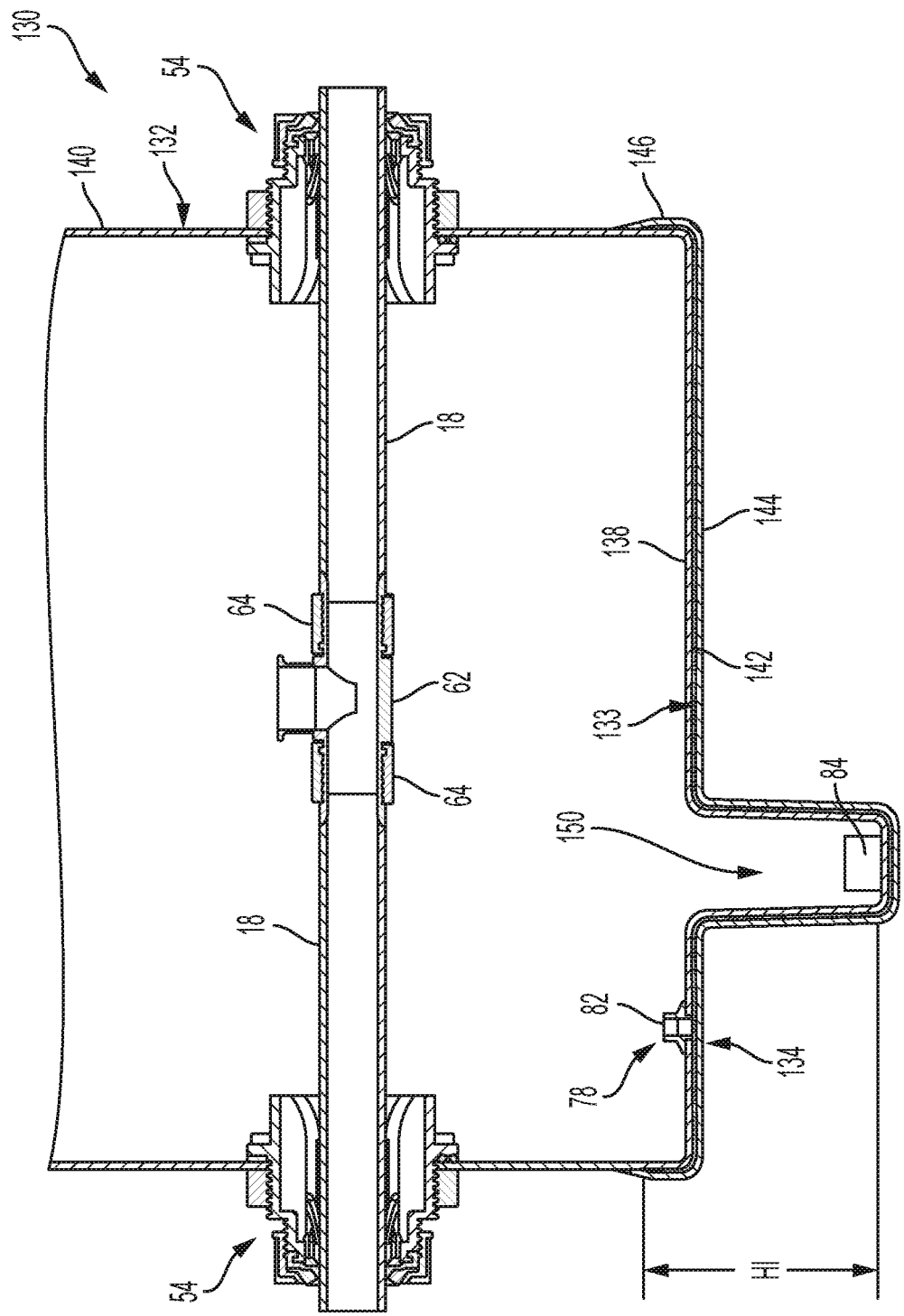
FIG. 11 is an elevation, cross section view of an alternative dispenser sump made in accordance with the present disclosure.

Turning now to FIG. 11, an alternative dispenser sump 130 is illustrated. Dispenser sump 130 is similar in structure and function to dispenser sump 30 described herein, and reference numerals of dispenser sump 130 are analogous to reference to numerals used in dispenser sump 30, except with 100 added thereto. Elements of dispenser sump 130 correspond to similar elements denoted by corresponding reference numerals of dispenser sump 30, except as otherwise described herein. All systems and structures usable in conjunction with dispenser sump 30 are also usable with dispenser sump 130 except as otherwise described herein. In addition, the principles of manufacturing and production, described above with respect to FIGS. 13-16, may also be applied and/or adapted for use in producing dispenser sump 130.

Dispenser sump 130 includes modified primary and secondary containers 132, 134 which incorporate a recessed double-walled sump area 150 which extends downwardly away from bottom walls 138, 144, which are otherwise unmodified as compared to bottom walls 38, 44 of containers 32 and 34 described above. This recessed sump area 150 creates a reduced collection volume for any fluid which may be introduced into the interior of dispenser sump 130, such that fluid intrusion will be detected in a similar manner as dispenser sump 30 described above.

However, sidewall 146 of secondary container 134 does not extend upwardly along sidewall 140 of primary container 132 as far as sidewall 46 of dispenser sump 30 (FIG. 5). For example, sidewall 146 may extend upwardly along sidewall 140 by less than 10% of the height of sidewall 140, by less than 2 inches, for example. Despite this reduced upward extension of sidewall 146, interstitial height HI is maintained by the downward protrusion of sump area 150. Thus, use of dispenser sump 130 as shown in FIG. 11 allows for the same interstitial height HI to be achieved above the activation point of the sensor, with the protective and operational benefits discussed above with respect to a double-walled sump area. This protective benefit is realized with less of the height of primary container 132 occupied by secondary container 134. This reduced height construction may be employed, for example, in designs where apertures 52 or other penetrations through sidewall 140 of primary container 132 are at a lower position at or near bottom 138.

In use, dispenser sumps 30, 130 can be tested with a simple but robust procedure. In particular, the fluid-tightness of double-walled sump area 50 or 150 may be tested using pressure module 90 as discussed above, in order to ensure the integrity of interstitial space 33. This, in turn, obviates the need for the introduction of water or another fluid to the interior of dispenser sump 30, 130 for such integrity testing as may be required or desired for environmental protection and any associated regulatory compliance. The time needed for such testing is thereby reduced, and no hazardous fluid disposal is required after each test.

At the same time, the single-wall penetration of apertures 52 or other penetrations through sidewall 40, 140 facilitates the use of single-wall sealing technologies such as conduit adapter 54 (FIG. 2), such that the wall penetrations are simplified and any risk of leakage through an entry fitting over the long service life of dispenser sump 30, 130 is minimized. In this way, dispenser sumps 30, 130 preserve or improve upon the reliability of double-walled containment, while reducing the overall cost and complexity associated with traditional double-walled containment systems. To the extent that any leak or other breach may occur during service, the interstitial height HI can be set to a sufficient height (e.g., 4 to 6 inches) to ensure adequate response and remediation time for an operator of fueling station 10. For example, controller 86 may shut down an individual dispenser 12 associated with a detection of fluid in dispenser sump 30 where operators are available and on site, leaving submersible pumps associated with underground storage tanks 14 activated so that the remaining fuel dispensers 12 may remain operational. On the other hand, where no personnel are on site for immediate inspection, the submersible pumps and underground storage tanks 14 may be shut off by an indication of fluid in any of the several dispenser sumps 30 which may be present in fueling station 10, such that the entire system is deactivated until further inspection and/or remediation can occur.

While the foregoing discussion has been focused on the use of both double- and single-wall construction in a single dispenser sump 30, 130, it is contemplated that this technology can be employed for other sump structures used in fueling station 10. For example, tank sumps 20, shown in FIGS. 1 and 12, may also include a primary container 232 and a secondary container 234 which are similar in structure and function to primary and secondary containers 32, 34 of dispenser sump 30 described in detail above. Tank sump 20 is similar in structure and function to dispenser sump 30 described herein, and reference numerals of tank sump 20 are analogous to reference to numerals used in dispenser sump 30, except with 200 added thereto. Elements of tank sump 20 correspond to similar elements denoted by corresponding reference numerals of dispenser sump 30, except as otherwise described herein. All systems and structures usable in conjunction with dispenser sump 30 are also usable with tank sump 20 except as otherwise described herein.

Figure 12:
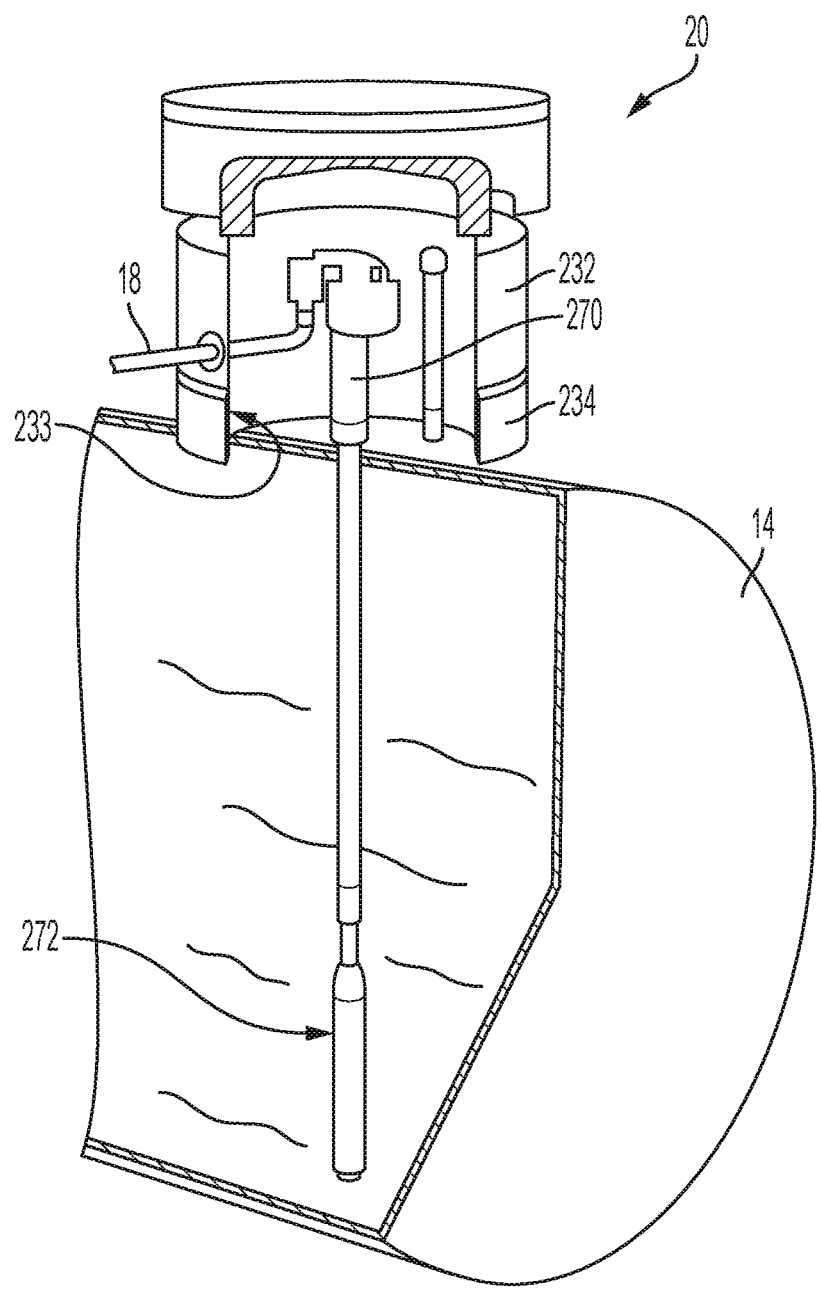
FIG. 12 is a perspective, partial cross-section view of an underground storage tank and a tank sump made in accordance with the present disclosure mounted thereto.

As shown in FIG. 12, tank sump 20 may be mounted on top of underground storage tank 14 and contains pump head 270 which is operably connected to submersible turbine pump 272 disposed in tank 14. Fuel delivery conduit 18 extends outwardly from the sidewall of primary container 232 above the top of secondary container 234, thereby creating the same type of "low-rise" double walled construction described in detail above with respect to dispenser sump 30.

An exemplary tank sump 20 which may include low-rise double walled construction in accordance with the present disclosure is described in U.S. Patent Application Publication No. 2018/0257925 filed Mar. 7, 2018 and entitled METHOD AND APPARATUS FOR LIMITING ACIDIC CORROSION AND CONTAMINATION IN FUEL DELIVERY SYSTEMS, the entire disclosure of which is hereby expressly incorporated herein by reference.

In addition to sumps 20 and 30 described herein, other sump structures such as electrical conduit sump structures, or other applications where penetrations through the sidewall of the sump are necessary, may benefit from the "low-rise" double-walled constructed described herein. Moreover, as used herein, a "containment sump" may be any sump structure used in connection with fueling station 10, including dispenser sumps, tank sumps, electrical conduit sumps, or any other sumps used for fueling systems.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A containment sump, comprising:
a container including a sidewall and defining an interior volume sized to receive at least part of a component of a fueling installation, the sidewall defining an aperture for entry of the component of the fueling installation from an exterior to the interior volume of the sump; and
at least one wall defining an interstitial space extending partially up the sidewall and positioned entirely below the aperture, such that the interstitial space will be positioned below a leak from the component falling by gravity within the interior volume of the sump, the interstitial space defined by the at least one wall spaced from the aperture, whereby the component of the fueling installation can be inserted through the aperture into the interior volume of the container without passing through the interstitial space.

2. The containment sump of claim 1, wherein the at least one wall cooperates with the sidewall of the container to define the interstitial space.

3. The containment sump of claim 2, where the at least one wall is positioned exterior of the sidewall of the container and exterior of the interior volume of the container.

4. The containment sump of claim 1, wherein the at least one wall comprises a first wall and a second wall, the first wall secured to the second wall to define the interstitial space.

5. The containment sump of claim 4, wherein:
the container is a primary container;
the first wall is joined to the second wall in a subassembly forming a secondary container, the subassembly defining the interstitial space; and
the secondary container is secured to the primary container.

6. The containment sump of claim 1, wherein the at least one wall is spaced from the entry, whereby the component of the fueling installation can be inserted through the entry into the interior volume of the sump without passing through the at least one wall.

7. The containment sump of claim 1 in combination with a fueling installation comprising:
a fuel storage tank; and
a fuel dispenser, the component of the fueling installation in fluid communication with the fuel storage tank and the fuel dispenser.

8. The combination of claim 7, wherein the component of the fueling installation comprises a fitting for joining a first fluid conduit and a second fluid conduit.

9. A containment sump, comprising:
a primary container having a primary wall extending from an open upper end to a closed lower end of the primary container; and
a secondary container positioned at the closed lower end of the primary container and extending at least partially up the primary wall of the primary container, the secondary container having a secondary wall extending from an open upper end to a closed lower end of the secondary container, the secondary container secured to a bottom portion of the primary wall to form a double-walled containment sump having a sealed interstitial space extending between the closed lower ends of the primary and secondary containers, and only extending partially up the primary wall, wherein a height of the secondary container is less than or equal to 35% of a height of the primary container.

10. A containment sump, comprising:

a primary container having a primary wall extending from an open upper end to a closed lower end of the primary container; and a secondary container positioned at the closed lower end of the primary container and extending at least partially up the primary wall of the primary container, the secondary container having a secondary wall extending from an open upper end to a closed lower end of the secondary container, the secondary container secured to a bottom portion of the primary wall to form a double-walled containment sump having a sealed interstitial space extending between the closed lower ends of the primary and secondary containers, and only extending partially up the primary wall, wherein the primary container includes at least one aperture formed through the primary wall above the bottom portion thereof, such that the upper end of the secondary container is positioned below the aperture.

11. The containment sump of claim 10, further comprising a conduit adapter disposed in the aperture and sealingly connected to the primary wall.

12. The containment sump of claim 11, further comprising a conduit passing through the conduit adapter and into an interior of the primary container, the conduit sealingly connected to the conduit adapter.

13. The containment sump of claim 10, wherein the at least one aperture comprises a plurality of apertures formed in a first side and a second side of the primary wall above the bottom portion thereof, such that the upper end of the secondary container positioned below each of the plurality of apertures.

14. The containment sump of claim 13, further comprising a plurality of conduit adapters respectively disposed in each of the plurality of apertures and sealingly connected to the primary wall.

15. The containment sump of claim 14, further comprising:

a plurality of conduits respectively passing through each conduit adapter and into an interior of the primary container, each of the plurality of conduits sealingly connected to its respective conduit adapter; and a valve assembly fluidly connected to each of the plurality of conduits within the interior of the primary container, the valve assembly operable to selectively admit or prevent fluid flow from the respective conduit to a downstream delivery point via a downstream delivery conduit.

16. The containment sump of claim 15, further comprising a support structure disposed proximate the upper end of the primary container, the valve assembly coupled to and supported by the support structure.

17. The containment sump of claim 9, wherein the interstitial space is contiguous across the primary and secondary walls and across the lower ends of the primary and secondary containers.

18. The containment sump of claim 9, further comprising:

a top wall sealingly connected to the upper end of the primary container; and an arrangement of hangers fixed to an outer surface of the top wall and positioned to engage a support structure adjacent the top wall.

19. The containment sump of claim 9, further comprising a layer of porous fabric material disposed in the interstitial space.

20. The containment sump of claim 9, wherein the primary container includes an interstitial port formed therethrough which is in fluid communication with the interstitial space, the containment sump further comprising a fitting fixed about the interstitial port and adapted to sealingly connect to a conduit.

21. The containment sump of claim 10, wherein a height of the secondary container is less than or equal to 35% of a height of the primary container.

22. The containment sump of claim 9, wherein the double-walled containment sump includes a recessed sump portion protruding downwardly away from the lower end of the primary container and the lower end of the secondary container.

23. The containment sump of claim 9, wherein the primary and secondary containers are made a material suitable for containing hydrocarbon product, and wherein the containment sump has a fluid capacity of at least 2-20 gallons.

24. The containment sump of claim 9, in combination with a fueling installation comprising:

a fuel storage tank;

a fuel dispenser;

a first fluid conduit extending from the fuel storage tank, through the primary wall of the primary container, and into an interior of the primary container; and a second fluid conduit extending from the interior of the primary container, through the primary wall of the primary container, and to the fuel dispenser, the second fluid conduit coupled to the first fluid conduit within the interior of the containment sump.

25. A containment sump, comprising:

a primary container having a primary wall extending from an open upper end to a closed lower end of the primary container; and a secondary container positioned at the closed lower end of the primary container and extending at least partially up the primary wall of the primary container, the secondary container having a secondary wall extending from an open upper end to a closed lower end of the secondary container, the secondary container secured to a bottom portion of the primary wall to form a double-walled containment sump having a sealed interstitial space extending between the closed lower ends of the primary and secondary containers, and only extending partially up the primary wall, in combination with a fueling installation comprising:

a fuel storage tank;

a fuel dispenser;

a first fluid conduit extending from the fuel storage tank, through the primary wall of the primary container, and into an interior of the primary container; and a second fluid conduit extending from the interior of the primary container, through the primary wall of the primary container, and to the fuel dispenser, the second fluid conduit coupled to the first fluid conduit within the interior of the containment sump, wherein the first fluid conduit and the second fluid conduit do not pass through the secondary wall of the secondary container.

26. The combination of claim 24, further comprising a valve functionally interposed between the first fluid conduit and the second fluid conduit, the valve disposed within the interior of the containment sump.

27. A containment sump, comprising:

a primary container having a primary wall extending from an open upper end to a closed lower end of the primary container; and a secondary container positioned at the closed lower end of the primary container and extending at least partially up the primary wall of the primary container, the secondary container having a secondary wall extending from an open upper end to a closed lower end of the secondary container, the secondary container secured to a bottom portion of the primary wall to form a double-walled containment sump having a sealed interstitial space extending between the closed lower ends of the primary and secondary containers, and only extending partially up the primary wall, in combination with a fueling installation comprising:

a fuel storage tank;

a fuel dispenser;

a first fluid conduit extending from the fuel storage tank, through the primary wall of the primary container, and into an interior of the primary container; and a second fluid conduit extending from the interior of the primary container, through the primary wall of the primary container, and to the fuel dispenser, the second fluid conduit coupled to the first fluid conduit within the interior of the containment sump, wherein the first fluid conduit and the second fluid conduit pass into the interior of the containment sump through respective apertures formed in the primary wall of the primary container, the upper end of the secondary container positioned below each of the respective apertures.

28. The combination of claim 27, further comprising a conduit adapter disposed in each of the apertures and sealingly connected to the primary wall of the containment sump, the first fluid conduit and the second fluid conduit sealingly engaged with a respective conduit adapter.

29. The combination of claim 24, wherein the interstitial space of the containment sump is contiguous across the primary and secondary walls and the primary and secondary lower ends.

30. The combination of claim 24, wherein the containment sump further comprises:

a top wall sealingly connected to the upper end of the primary container; and an arrangement of hangers fixed to an outer surface of the top wall and positioned to engage a support structure adjacent the top wall.

31. The combination of claim 24, further comprising a layer of porous fabric material disposed in the interstitial space of the containment sump.

32. The combination of claim 24, wherein the primary container of the containment sump includes an interstitial port formed therethrough which is in fluid communication with the interstitial space, the containment sump further comprising a fitting fixed about the interstitial port and adapted to sealingly connect to a conduit.

33. The combination of claim 25, wherein a height of the secondary container is less than or equal to 35% of a height of the primary container.

34. The combination of claim 24, wherein the double-walled containment sump includes a recessed sump portion protruding downwardly away from the lower end of the primary container and the lower end of the secondary container.

35. A method of testing the integrity of a containment sump, the containment sump comprising:

a primary container including an open primary upper end, a closed primary lower end, and a primary wall extending therebetween, the primary container defining a primary containment height; and a secondary container including an open secondary upper end, a closed secondary lower end, and a secondary wall extending therebetween, the secondary container defining a secondary containment height less than the primary containment height to form a double-walled sump area disposed at a bottom portion of the primary container;

a component passing through an aperture formed in the primary container, the secondary container secured to the bottom portion of the primary container to form a sealed interstitial space between the primary wall and the secondary wall, and between the primary lower end and the secondary lower end, the sealed interstitial space positioned below the aperture in the primary container;

the method comprising:

producing a pressure differential within the interstitial space as compared to an ambient pressure around the containment sump;

after the step of producing, monitoring the pressure differential for change for a predetermined period of time; and determining that an integrity of the interstitial space is sound if the change is below a threshold amount after the predetermined period of time.

36. The method of claim 35, further comprising:

determining that the integrity of the interstitial space is not sound if the change is at or above the threshold amount after the predetermined period of time; and taking a corrective action.

* * * * *